United States Patent [19]
Freeman et al.

[11] 3,824,451
[45] July 16, 1974

[54] PULSE MODULATED FOURIER TRANSFORM MAGNETIC RESONANCE SPECTROMETER UTILIZING QUADRATURE PHASE DETECTION AND HIGH PASS FILTER TO ELIMINATE UNDESIRED STRONG RESONANCE LINES

[75] Inventors: Raymond Freeman, Menlo Park; Howard D. W. Hill, Cupertino, both of Calif.

[73] Assignee: Varian Associates, Palo Alto, Calif.

[22] Filed: Nov. 15, 1972

[21] Appl. No.: 306,947

[52] U.S. Cl. .......................................... 324/0.5 R
[51] Int. Cl. .......................................... G01n 27/78
[58] Field of Search ......... 324/0.5 R, 0.5 A, 0.5 AC

[56] References Cited
UNITED STATES PATENTS

| | | | |
|---|---|---|---|
| 3,475,680 | 10/1969 | Anderson | 324/0.5 AC |
| 3,501,691 | 3/1970 | Ernst | 324/0.5 A |
| 3,581,191 | 5/1971 | Anderson | 324/0.5 AC |
| 3,588,678 | 6/1971 | Ernst | 324/0.5 A |

*Primary Examiner*—Michael J. Lynch
*Attorney, Agent, or Firm*—Stanley Z. Cole; Gerald M. Fisher

[57] ABSTRACT

A magnetic resonance spectrometer, for example a pulse modulated Fourier transform spectrometer system, wherein the carrier frequency is positioned on an undesired output resonance line, the receiver circuitry of the system including a quadrature phase detection stage in which the resonance lines falling on the positive and negative frequency side of the zero frequency position in the output spectrum corresponding to the carrier frequency component may be distinguished, the receiver circuitry including a high pass filter positioned between the quadrature phase detector stage and the analog to digital converter for removing all frequency components near the zero component from the signal transmitted to the analog to digital converter, whereby the strong undesired resonance line is eliminated from the output spectrum.

17 Claims, 6 Drawing Figures

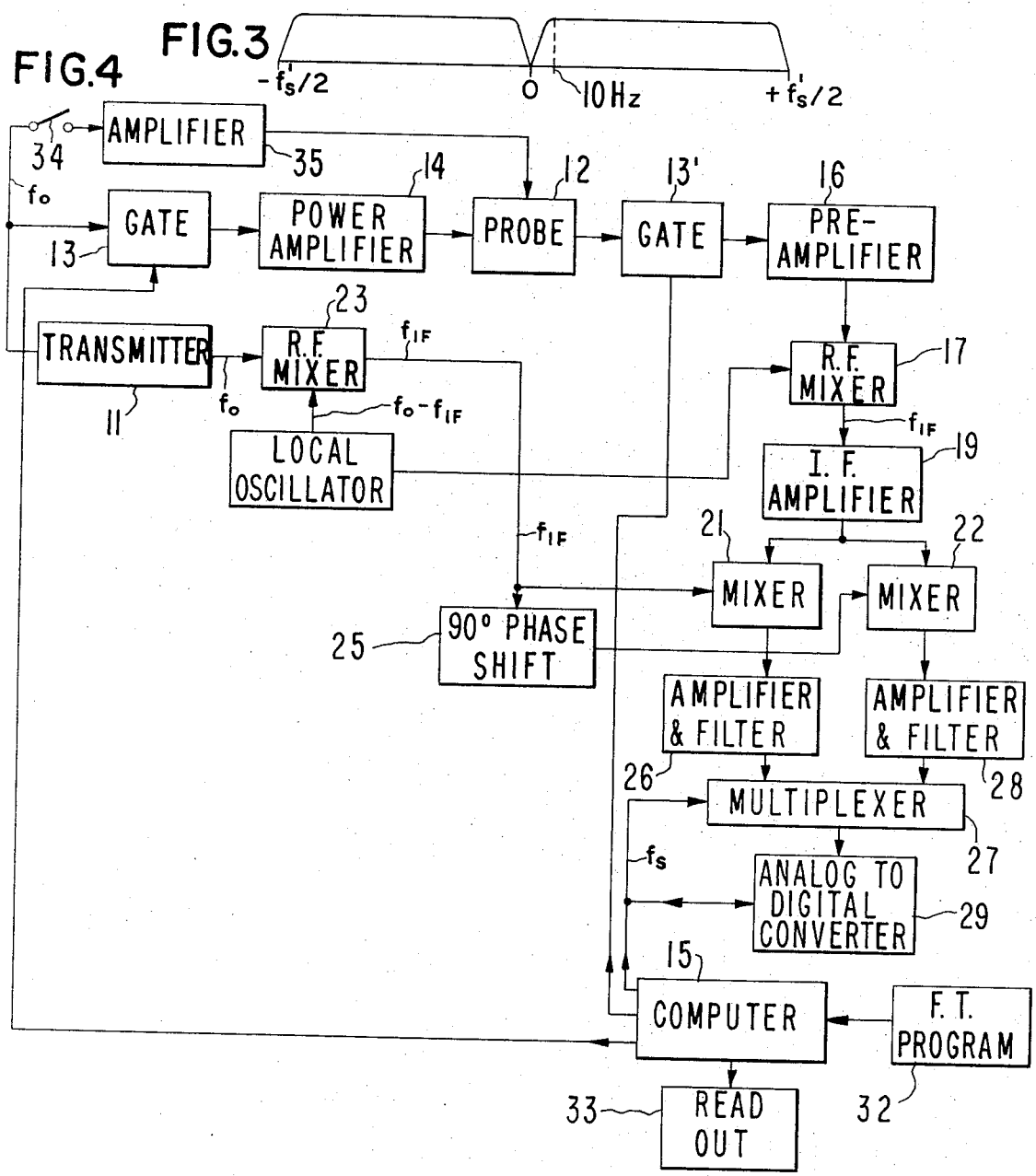

PULSE MODULATED FOURIER TRANSFORM MAGNETIC RESONANCE SPECTROMETER UTILIZING QUADRATURE PHASE DETECTION AND HIGH PASS FILTER TO ELIMINATE UNDESIRED STRONG RESONANCE LINES

BACKGROUND OF THE INVENTION

Fourier transform magnetic resonance spectrometers wherein pulse modulation techniques are utilized to produce broadband excitation of magnetic resonance in a sample under analysis are described in U.S. Pat. No. 3,475,680 issued Oct. 28, 1969 to W. Anderson et al. entitled "Impulse Resonance Spectrometer Including a Time Averaging Computer and Fourier Analyzer." In these spectrometers, the driving RF pulse excites simultaneous resonance of all of the resonance lines in the sample ranging from very strong lines to very weak lines. The receiver and analysis units of the system must respond to and operate on all of these resonance lines simultaneously.

These pulse modulated Fourier tranform magnetic resonance spectrometers often have practical difficulties when the amplitudes of the resonance signals span a relatively large dynamic range, since, unlike the continuous wave or swept type spectrometers, it was not previously possible in a pulse spectrometer to truncate a selected large unwanted resonance line without affecting the weaker resonance lines in the spectrum. These practical difficulties are further complicated by the process of digitizing the composite time-domain signal and storing the digitized result in the computer memory. The proper utilization of the ADC requires that the noise level at the input is represented by more than one bit and that the strongest signal is represented by less than the maximum number of bits since truncation must be avoided. Thus the dynamic range of the ADC must be greater than the signal to noise ratio of the largest signal. For practical size converters dynamic range is normally limited to, for example, $2^{12}$, whereas the signal to noise ratio for typical strong solvent lines, e.g. water, falls within the range of $2^{13}$ and $2^{20}$ in present day magnetic resonance spectrometers.

Signal amplitudes covering a large dynamic range can create other problems in the spectrometer. For example, any nonlinearities of the receiver and detection circuitry can introduce undesirable harmonic signals and intermodulation signals. In the limit, these large signals can cause saturation in the circuitry.

There are two common situations in which such very strong undesired resonance lines are produced. One such situation arises from the large resonance line of a solvent in which a dilute sample is mixed, particularly where the sample has weak resonance lines. The other situation is the strong resonance line produced by irradiation in double resonance experiments.

One solution for the problem encountered with a strong solvent line is described, for example, in the Letter to the Editor entitled "Pulsed Fourier-Transform NMR Spectrometer For Use With $H_2O$ Solutions" by Redfield et al., Journal of Chemical Physics, Volume 54, 1971, pages 1418 and 1419. In accordance with that solution the large unwanted resonance signal is avoided by carefully choosing the length (pulse width) and strength for the RF driving pulse; the spins of the sample are flipped with a relatively long weak RF pulse which is in resonance with, and is the optimum length for, the spins of interest, but is off resonance for the unwanted spins and causes them to precess through an angle of substantially 360° about the effective field in the rotating frame of reference such that the detected signal from this component is substantially reduced or eliminated.

In Redfield, the carrier is positioned in the midportion of the observed output spectrum, a dual phase detector system being utilized to distinguish the resonance lines on either side of the zero reference line; lowpass band filters are utilized to block the frequencies beyond either end of the spectrum of interest. The large unwanted $H_2O$ signal component is located beyond one end of the spectrum of interest such that the lowpass filtering aids in eliminating the strong undesired line.

Generally, in earlier pulse modulated Fourier transform spectrometers, the heterodyne reference frequency in the spectrometer is arranged to fall to one side or the other of the spectrum of interest such that the various gyromagnetic resonance frequencies are all higher than or all less than this reference frequency. After heterodyning, the frequencies of the output spectrum are then all positive or all negative. However, utilization of a dual quadrature phase detector system in the receiver section of such a spectrometer, as shown and described in U.S. Pat. No. 3,501,691, issued Mar. 17, 1970 to R. Ernst entitled "Single Sideband System for Improving the Sensitivity of Gyromagnetic Resonance Spectrometers," permits the reference frequency to be set within the range of the various gyromagnetic resonance frequencies, for example the center, such that the resonance lines on either side of this reference can be distinguished even though they have the same absolute frequency separation from the reference. As described in this latter patent, a substantial improvement in the signal to noise ratio of the spectrometer is obtained with this quadrature phase detection; in addition, this technique permits the operator to set the reference frequency at any desired position within the resonance spectrum output as in the Redfield experiment, and to observe the particular portion of the spectrum of interest.

BRIEF SUMMARY OF THE PRESENT INVENTION

The present invention provides a novel magnetic resonance spectrometer system, e.g. a pulse modulated Fourier transform magnetic resonance spectrometer, wherein any selected undesired resonance line is removable from the output signal before reaching the analog to digital converter stage of the receiver. In this spectrometer a dual phase detector system is employed and the reference frequency of the phase detector or any of the heterodyne frequencies are adjusted with respect to the spectrometer operating field such that the selected unwanted gyromagnetic resonance line falls at zero frequency in the output of the phase sensitive detector. This component of the resonance signal is then eliminated or substantially reduced by means of a high pass filter which blocks the frequency components in a narrow frequency band about zero frequency before the resonance signals reach the analog to digital converter.

In one embodiment of the invention, the reference frequency is the transmitter frequency; in another embodiment the reference frequency is offset relative to the transmitter frequency. Stochastic resonance and time share systems are also disclosed embodying the present invention.

One embodiment of this invention employs a signal with the same frequency as the reference frequency utilized for irradiation purposes in a double resonance experiment such that the dual phase detector system and high pass filter eliminate the strong resonance signal produced, in response to the irradiation signal, from the output spectrum of the spectrometer.

It should be understood that although this invention is described with particular reference to reducing or eliminating a relatively strong signal component this invention is not so limited in that any undesired signal component may be reduced or eliminated, including relatively weak components.

BRIEF DESCRIPTION OF THE DRAWINGS

FIG. 1 is an example of an output spectrum obtained from a typical prior art pulse modulated Fourier transform magnetic resonance spectrometer in which the reference frequency component is set at the zero frequency end of the spectrum and the spectrum of interest displayed in the frequency range up to $f_s/2$, when $f_s$ is the sampling frequency of the time averager, and wherein a large, often undesired, resonance line appears in the spectrum.

FIG. 2 is a trace of the output spectrum obtained with the system of the present invention wherein the reference frequency is made to coincide with the undesired resonance line such that the various resonance lines in the output spectrum appear at the negative and positive frequency values between the values $-f_s'/2$ and $+f_s'/2$, the components at the reference frequency occurring at zero frequency and being eliminated from the spectrum.

FIG. 3 shows the characteristics of the filtering devices which provide lowpass filtering at either end of the spectrum to eliminate or greatly reduce frequencies beyond $-f_s'/2$ and $+f_s'/2$ and the high pass filtering which produces a notch effect to eliminate the frequencies very close to zero frequency and thus eliminate the undesired resonance line from the spectrum of FIG. 2.

FIG. 4 is a block diagram of one preferred embodiment of the present invention wherein the transmitter frequency is the reference frequency.

DESCRIPTION OF THE PREFERRED EMBODIMENTS

Figure 5:
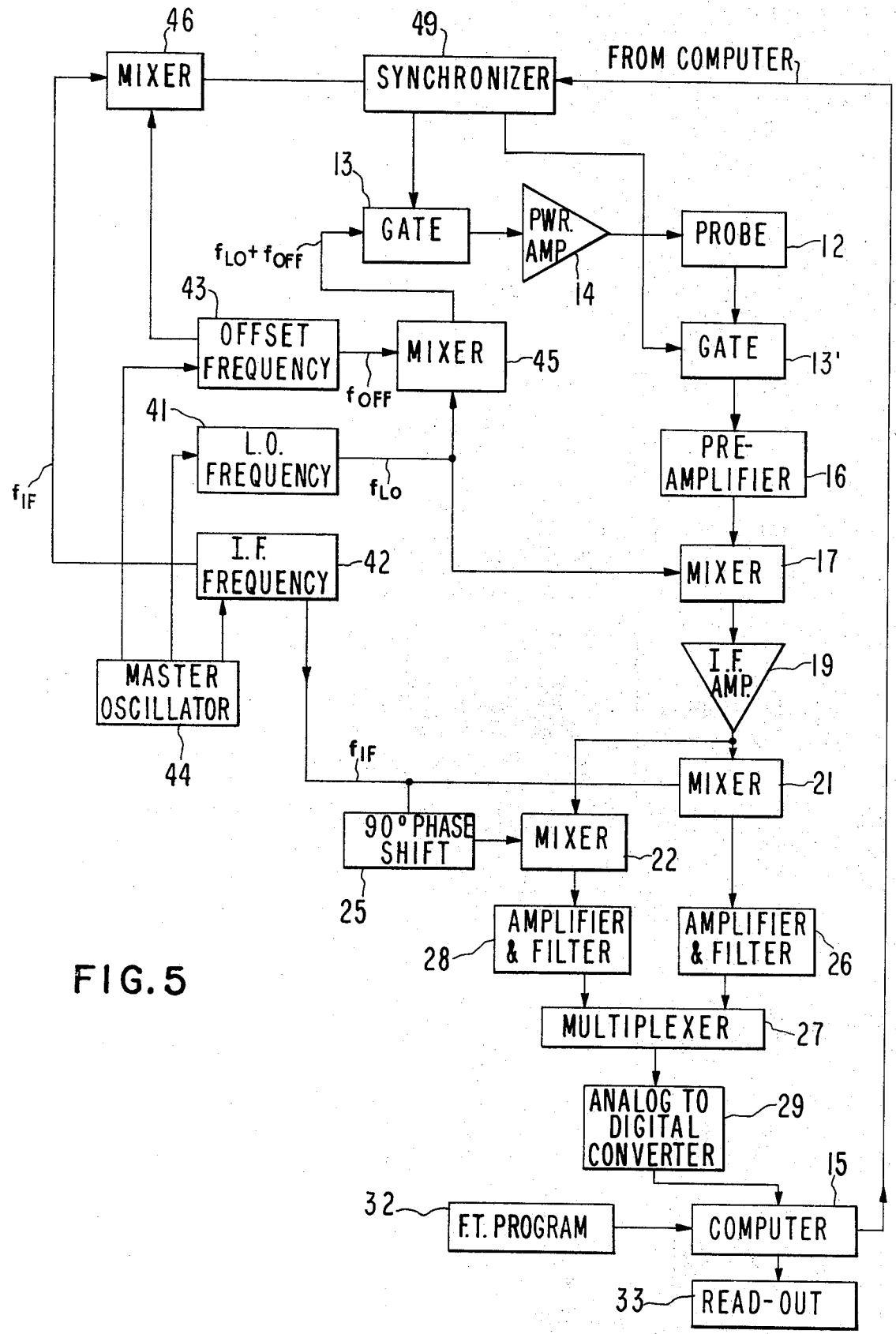
FIG. 5 is a block diagram of another embodiment of this invention wherein the reference frequency is offset relative to the transmitter frequency.

Referring now to FIg. 1 there is shown a typical form of output spectrum obtained with a known form of pulse modulated Fourier transform magnetic resonance spectrometer operating in the single sided manner. The reference frequency is chosen to be lower than all the frequencies of the resonance components of interest such that after heterodyning dyning the output frequencies are all positive and lie between 0 and $+f_s/2$ when $f_s$ is the sampling rate for each channel of the memory device. If desired, in the prior art the reference could have been chosen to be higher than all resonance frequency components such that the output frequencies would have been negative. In the illustrated spectrum there is a very strong resonance line near the mid-point of the spectrum, and this resonance line could be an undesired resonance line, for example, the strong proton line from water when water is used as the solvent for a sample under analysis with very weak proton resonance lines. The undesired strong resonance line could also exist due to the irradiation of a sample with a very strong driving radio frequency field at that particular frequency to produce the spin coupling disturbance desired in double resonance experiments.

The occurrence of such a strong undesired resonance line in the spectrum of interest requires that the analog-to-digital converters in the receiver circuitry have a very large dynamic range. Should the undesired resonance line be greatly larger than the weak resonance lines of the sample, the analog-to-digital converter may not be capable of distinguishing the weak resonance lines, and such weak resonance lines will not appear or will appear as distorted lines on the output spectrum display.

Referring now to FIG. 2 there is shown an output spectrum of a pulse modulated Fourier transform system utilizing the novel technique of the present invention wherein the large undesired resonance line has been set at the zero frequency reference point of the output spectrum and the weaker resonance line components of interest fall on either side of the zero point of the spectrum. A dual phase detector system is utilized in the receiver circuitry before the analog-to-digital converter to distinguish the frequencies on either side of the zero reference point so that the output spectrum may be displayed with the various resonance lines correctly positioned and spaced one from the other. A high pass filter is utilized in the circuit before the analog-to-digital converter to pass all frequencies except the frequency components very near the zero point in the spectrum, i.e. over a band of about $-10$ to $+10$ Hz. In this way the large unwanted resonance line component centered at zero is eliminated from the signal transmitted to the analog-to-digital converter. The further filter characteristics of the system of the present invention are shown in FIG. 3 and illustrate the roll off at the two ends of the spectrum $-f_s'/2$ and $+f_s'/2$, where $f_s'$ is the sampling rate, and the roll off of the pass band very near the zero center point which, in effect, produces a notch in the spectrum at the zero frequency position. To cover the same spectral region as in the illustration of FIG. 1, $f_s' = f_s/2$.

Referring now to FIG. 4 there is shown a preferred embodiment of the invention for producing the output spectrum of the type illustrated in FIG. 2. The RF transmitter 11 operating at a carrier frequency $f_0$ which is made to coincide with the resonance frequency of the strong undesired resonance line, e.g. the solvent resonance line, is coupled to the sample probe 12 via a gate circuit 13 and a power amplifier 14. The gate circuit 13 is controlled from the computer 15 to provide the desired spaced apart RF pulses of frequency $f_0$ to the probe 12 in well known manner i.e. as described in U.S. Pat. No. 3,475,680 to produce the broadband excitation of the sample to produce simultaneous resonance of the plurality of resonance lines in the sample in accordance with pulse modulation techniques. The pulses may, for example, be spaced at one second intervals, each pulse having a time duration of from 10 to 100 μs.

The various resonance signals in the sample, including the strong resonance signal from the solvent, are detected by the receiver circuitry in the probe 12 and transmitted via the preamplifier 16 to the radio frequency mixer circuit 17. It is desirable that the receiver circuitry be decoupled from the probe during RF pulse transmission and coupled thereafter and a second gate 13' is positioned between the probe 12 and amplifier 16 for this purpose. A local oscillator circuit 18 provides a suitable radio frequency signal to the mixer 17 which mixes with the incoming radio frequency resonance signals and produces suitable intermediate frequency outputs from the mixer 17. The output of the mixer 17 is transmitted through an IF amplifier 19 to a pair of radio frequency mixers or phase detectors 21 and 22.

The output of the transmitter 11 is also transmitted to a radio frequency mixer 23 where it is mixed with the signal from the local oscillator 18 to produce a reference signal output $f_{IF}$. In a typical form of magnetic resonance system employed in this invention, the carrier frequency $f_o$ may be 100 MHz for proton resonance and the local oscillator may be operating at a frequency of about 95 MHz to give an intermediate frequency $f_{IF}$ of about 5 MHz. The reference signal $f_{IF}$ is transmitted directly to RF mixer 21 and is also transmitted through a 90° phase shift circuit 25 to the other RF mixer 22. These quadrature phase detectors operate to distinguish between the negative frequencies on one side of the spectrum in which the carrier frequency component is set at zero frequency and the positive frequencies on the other side of zero frequency.

The DC and audio frequency output of mixer 21 is transmitted via an amplifier and filter circuit 26 to a multiplexer circuit 27 and the output of mixer 22 is transmitted via a second amplifier and filter circuit 28 to the multiplexer 27. Each of the amplifier and filter circuits 26 and 28 contain lowpass analog filters of the same shape to limit the bandwidth of the output spectrum to the desired width. Each circuit 26 and 28 also contain an analog high pass filter which serves to remove those frequencies from about 0 to 10 Hz and, in effect, produce the notch in the center of the spectrum as illustrated in FIG. 3.

The two output signals from circuits 26 and 28 are fed to the multiplexer 27 which samples in synchronism with the control signal $f_s$ from the computer 15 to feed the signals alternately to the analog-to-digital converter 29, each output signal being fed once each sampling period of the multiplexer. The analog-to-digital converter 29 samples the signals at the sampling rate $f_s'$, typically about 500 Hz, and feeds them to the associated storage channels of the computer 15 where the stored signal is operated on by the Fourier transformation program 32 to provide the resultant magnetic resonance spectrum output to the read out unit 33.

In another mode of operation of the system of FIG. 4, the undesired strong resonance line may result from an irradiation of the sample by a strong driving radio frequency signal in a double resonance experiment. Such a strong excitation signal is provided to the sample in the probe 12 from the transmitter 11 via the switch 34 and amplifier 35. Since the system is operated such that the frequency component in the output spectrum corresponding to the irradiation frequency is set at the zero position, the resonance signal corresponding to this irradiation frequency is blocked by the high pass filter in the circuits 26 and 28 and this component does not pass to the analog to digital converter.

It should be noted that the carrier frequency $f_o$ may be positioned at any selected position along the spectrum by adjusting $f_o$ in relation to the total applied static polarizing field, $H_o$, and the spectral width opened up to cover the spectrum of interest by increasing the sample rate $f_s$ and opening up the band pass of the lowpass filters.

In the above described system, the carrier frequency corresponded to the frequency of the undesired resonance line. In the system of FIG. 5, the carrier frequency is offset from the undesired line but the system still provides for selective elimination of the undesired line. Those elements of FIG. 5 similar in operation to the elements of FIG. 4 bear the same reference numerals and the details of operation will not be repeated. However, the transmitter circuitry has been modified and includes three separate sources of radio frequency, a local oscillator 41 providing $f_{LO}$ at about 95 MHz, an intermediate frequency source 42 providing $f_{IF}$ at about 5 MHz, and an offset frequency source 43 providing $f_{OFF}$ at about 5.001 MHz. All three sources are controlled from a master oscillator source 44 so that all the frequencies will remain locked to a common control frequency.

The frequency outputs from the local oscillator 41 and the offset source 43 are mixed in mixer 45 to give a driving radio frequency output $f_o$ to the sample of $f_{LO} + f_{OFF}$, e.g., 100 MHz + 1 KHz. The output signal from the probe is mixed in mixer 17 with the frequency $f_{LO}$ to give an output frequency of 5.001 MHz which is mixed with $f_{IF}$ of 5.000 MHz in the two phase detectors 21 and 22. The zero output frequency in the receiver section corresponds to an RF frequency generated in the probe of $f_{LO} + f_{IF}$ or 95 MHz + 5 MHz = 100 MHz, as distinguished from the transmitter frequency of $f_{LO} + f_{OFF}$ or 95 MHz + 5.001 MHz, and an undesired resonance line at 100 MHz may be eliminated from the output spectrum by the high pass filtering effect in the amplifier circuits 26 and 28 as explained above.

It is necessary that the pulses delivered to the sample be properly synchronized to $f_{OFF} - f_{IF}$ (5.001 MHz − 5.000 MHz) and a synchronizing circuit 49 is provided which is coupled to the mixer 46 fed from the offset frequency source 43 and the IF frequency source 42, the mixer 46 producing the desired 1 KHz signal. Thus the gate control signals from the computer are synchronized with the zero crossing of the 1 KHz signal.

Figure 6:
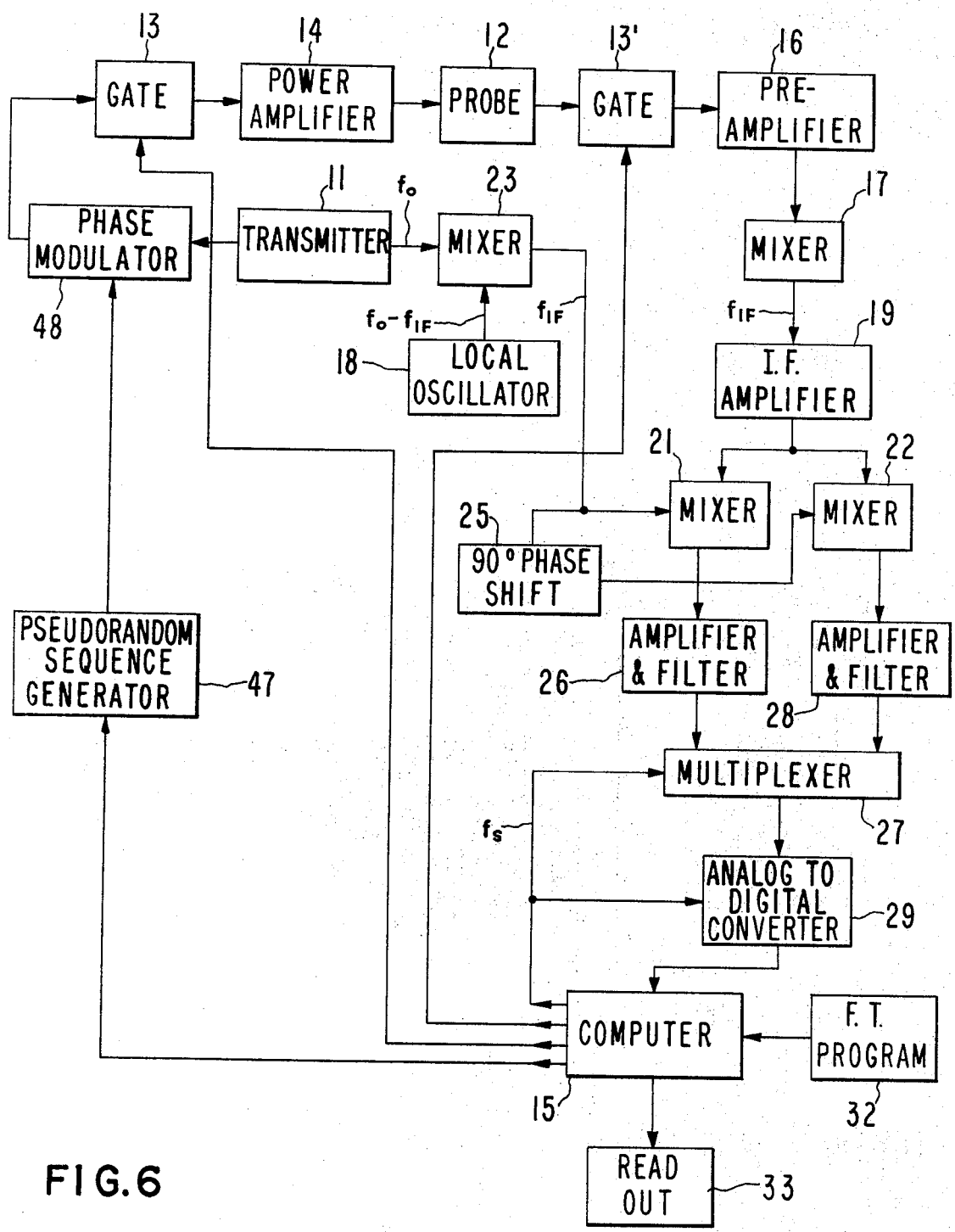
FIG. 6 is a block diagram of still another embodiment of the present invention, this system employing stochastic resonance techniques as well as time-share.

The system of FIG. 6 is similar to the system of FIG. 4 except that the magnetic resonance of the sample is produced by stochastic resonance techniques of the type described in U.S. Pat. No. 3,581,191 issued May 25, 1971 to W. Anderson entitled "Phase Correlation For An RF Spectrometer Employing An RF Carrier Modulated By A Pseudorandom Sequence." Elements similar to those of the system of FIG. 4 bear the same reference numerals. In this system, a pseudorandom sequence generator 47 and a phase modulator 48 may be provided such that the pulses of RF frequency are applied in repetitive similar trains of pulses, each train of pulses comprising a random sequence of pulses of different phase, e.g. 0° or 180°. One or more samplings of the output resonance signal are made between adjacent pulses in each sequence. A time share technique disclosed in the copending patent application entitled "Magnetic Resonance Spectrometer Employing Stochastic Resonance By A Pseudorandom Binary Sequence and Time Share Modulation," Ser. No. 300,929 filed Oct. 26, 1972 by Ernst and Anderson may be employed in this system by operating the gate 13' so that the receiver is decoupled from the probe 12 during application of the RF pulses to the probe and the probe and receiver are coupled through the gate during the periods between the transmitter pulses.

Further embodiments of this invention may be envisaged in any gyromagnetic resonance spectrometer excited by broadband means, not necessarily regularly-spaced pulses, stochastic or pseudo-random pulses or white noise sources.

What is claimed is:

1. A method for obtaining a magnetic resonance spectrum from a sample under analysis including the steps of applying a driving radio frequency magnetic field from a transmitter to a sample located in a unidirectional strong magnetic field to produce simultaneous resonance of the multiple magnetic resonance lines in the spectrum of the sample, detecting the multiline resonance signal output of the sample, sampling and storing the multiline resonance signal output from said detector for time-averaging and for computation of said magnetic resonance spectrum for recording and display, said detecting step including the steps of detecting said multiline resonance signal from the sample in a phase detector by feeding into said phase detector a reference signal and a signal having a frequency information content representative of said multiline resonance signal from the sample, causing said reference signal to coincide in frequency with the frequency of a to-be-deleted line in said signal representative of said multiline resonance signal from the sample, separating from said phase detector output the frequency components which are not substantially near zero frequency, and coupling only said separated frequency components to said sampling and storing apparatus.

2. The method as claimed in claim 1 wherein the transmitter frequency applied to the sample to produce resonance is set at the frequency of said particular to-be-deleted resonance line.

3. The method as claimed in claim 2 wherein said step of phase detecting includes the steps of mixing a signal at the transmitter frequency with a second radio frequency signal to obtain a reference intermediate radio frequency signal, mixing the multiline resonance signal output from the sample with said second radio frequency signal to obtain an intermediate frequency composite output signal, and mixing said intermediate frequency composite output signal with said reference intermediate frequency to obtain a first audio signal output to be sampled, and mixing said intermediate frequency composite output signal with a signal at the frequency of said reference intermediate frequency but in phase quadrature therewith to obtain a second audio signal output to be sampled, the transmitter frequency component of the resonance signal output lying at approximately the zero frequency position of the audio output spectrum with said first and second audio signal outputs lying on either side of the zero position, said first and second audio signal outputs being filtered to eliminate the components from said audio signal outputs corresponding to the frequency substantially at the transmitter frequency.

4. The method as claimed in claim 3 including the step of applying a second driving radio frequency magnetic field to said sample near the carrier frequency value for double resonance.

5. The method as claimed in claim 1 including the step of applying a second driving radio frequency magnetic field to said sample near said particular resonance line frequency for double resonance.

6. The method of claim 1 wherein the step of causing said reference signal to coincide with the frequency of a to-be-deleted signal includes deriving said reference signal from said transmitter frequency.

7. The method of claim 1 wherein the step of causing said reference signal to coincide with the frequency of a to-be-deleted signal includes deriving said reference signal from a master oscillator.

8. A method for obtaining a magnetic resonance spectrum from a sample under analysis including the steps of applying a driving radio frequency magnetic field from a transmitter to the sample located in a strong unidirectional magnetic field in the form of RF pulses to produce a simultaneous resonance of the multiple magnetic resonance lines in the spectrum of the sample, detecting the multiline resonance signal output of the sample, sampling the output of the detector to obtain a multiplicity of time-displaced components, each such sampled component being sampled a number of times, each plurality of sampled components being stored in an associated respective memory channel in a storage device, performing a Fourier transform computation on the stored signals to produce a magnetic resonance spectrum for recording and display, said detecting step including the steps of detecting said multiline resonance signal from the sample in a phase detector by feeding into said phase detector a reference signal and a signal having frequency information content representative of said multiline resonance signal from the sample, causing said reference signal to coincide in frequency with the frequency of a to-be-deleted line in said signal representative of said multiline resonance signal from the sample, separating from said phase detector output the frequency components which are not substantially near zero frequency, and coupling only said separated frequency components to said sampling and storing apparatus.

9. The method as claimed in claim 8 wherein the transmitter frequency applied to the sample to produce resonance is set at the frequency of said to-be-deleted resonance line.

10. The method as claimed in claim 8 wherein said step of phase detecting includes the steps of mixing a signal at the transmitter frequency with a second radio frequency signal to obtain a reference intermediate radio frequency signal, mixing the multiline resonance signal output from the sample with said second radio frequency signal to obtain an intermediate frequency composite output signal, and mixing said intermediate frequency composite output signal with said reference intermediate frequency to obtain a first audio signal output to be sampled, and mixing said intermediate frequency composite output signal with a signal at the frequency of said reference intermediate frequency but in phase quadrature therewith to obtain a second audio signal output to be sampled, the transmitter frequency component of the resonance signal output lying at approximately the zero frequency position of the audio output spectrum with said first and second audio signal outputs lying on either side of the zero position, said first and second audio signal outputs being filtered to eliminate the components from the audio signal outputs corresponding to the frequency substantially at the transmitter frequency.

11. The method as claimed in claim 10 including the step of applying a second driving radio frequency magnetic field to said sample at the carrier frequency value for double resonance.

12. The method as claimed in claim 8 including the step of applying a second driving radio frequency magnetic field to said sample at said carrier frequency for double resonance.

13. The method as claimed in claim 8 wherein said RF pulses applied to the sample are applied in a pseudorandom sequence.

14. Apparatus for obtaining a magnetic resonance spectrum from a sample under analysis comprising a driving radio frequency magnetic field transmitter for applying RF pulses to the sample in a probe to produce simultaneous resonance of the multiple magnetic resonance lines in the spectrum of the sample, means for detecting the composite resonance signal output and means for sampling and storing said detector output to obtain a multiplicity of time-displaced components, including means for sampling and storing time-displaced components a number of times and adding each new stored value to the previously stored respective time-displaced components, means to Fourier transform said stored signals to produce a magnetic resonance spectrum for recording and display, one of said multiple resonance lines being an unwanted line which is to be eliminated from the displayed output spectrum, certain resonance lines being positioned on either side of said particular resonance line, wherein said means for detecting includes a quadrature phase detector, said phase detector having an output terminal, means to generate a selectable reference signal, said phase detector being adapted to receive a signal from said reference signal generator and from said probe, high pass filter means having a pair of outputs, said high pass filter means being connected to said phase detector output terminal for removing the frequencies substantially near and including zero frequency, said outputs of said high pass filter means being coupled to said means for sampling.

15. Apparatus of claim 14 wherein said high pass filter means includes a pair of similar filters, each said similar filter having a low frequency cutoff greater than the frequency components representative of the unwanted line.

16. Apparatus for obtaining a magnetic resonance spectrum from a sample under analysis comprising a driving radio frequency magnetic field transmitter for applying RF pulses to the sample in a probe to produce simultaneous resonance of the multiple magnetic resonance lines in the spectrum of the sample, means for detecting the composite resonance signal output and means for sampling and storing time-displaced components a number of times and adding to the previously stored respective time-displaced components, means to perform a Fourier transformation on the stored signals to produce a magnetic resonance spectrum for recording and display, said transmitter being adapted to provide the driving radio frequency of the RF pulses at a frequency value $f_o$ corresponding to the frequency of any particular magnetic resonance line of the sample which is to be eliminated from the output spectrum, means for mixing a signal at frequency $f_o$ with a second radio frequency signal at a frequency value of $f_o - f_{IF}$ to obtain a reference intermediate signal at $f_{IF}$, means for mixing the resonance signal output from the sample with said second radio frequency signal to obtain an intermediate frequency resonance signal, means for mixing said intermediate frequency resonance signal with a first reference intermediate signal at $f_{IF}$ to obtain a first audio signal output to be sampled and means for mixing said intermediate frequency resonance signal with a second reference signal at $f_{IF}$ but in phase quadrature with said first reference intermediate signal to obtain a second audio signal output to be sampled, the $f_o$ component of the resonance signal output lying at approximately the zero frequency position of the audio output spectrum with said first and second audio signal outputs lying on either side of the zero position, and high pass filtering means connected to said first and second audio signal outputs to eliminate the component of the audio signal output corresponding to the driving radio frequency value $f_o$.

17. Apparatus as claimed in claim 16 wherein said means for mixing said intermediate frequency output signal with siad first and second reference signals comprises a first mixer circuit and a second mixer circuit, and wherein said high pass filtering means comprises a first high pass filter coupled to the output of said first mixer and a second high pass filter coupled to the output of said second mixer.

* * * * *